United States Patent [19]
Navarro

[11] Patent Number: 6,068,223
[45] Date of Patent: May 30, 2000

[54] POSITION ADJUSTABLE GRIP SUPPORT FOR MOTION PICTURE CAMERA

[75] Inventor: Felipe Navarro, Granada Hills, Calif.

[73] Assignee: Panavision, Inc., Woodland Hills, Calif.

[21] Appl. No.: 08/979,812

[22] Filed: Nov. 25, 1997

[51] Int. Cl.[7] .................................................. F16M 11/04
[52] U.S. Cl. .................. 248/187.1; 224/265; 248/177.1; 396/420
[58] Field of Search .............................. 248/187.1, 177.1, 248/126, 219.4, 278.1, 558, 281.11, 282.1, 284.1; 396/425, 420, 419, 422, 424, 426, 421; 224/205, 265, 201, 908, 584

[56] References Cited

U.S. PATENT DOCUMENTS

| | | | |
|---|---|---|---|
| 2,746,369 | 5/1956 | Beard et al. ........................ | 224/265 X |
| 3,767,095 | 10/1973 | Jones ............................................ | 224/5 |
| 4,158,488 | 6/1979 | Gottschalk et al. ..................... | 352/243 |
| 4,158,489 | 6/1979 | Gottschalk et al. ..................... | 352/243 |
| 4,158,490 | 6/1979 | Gottschalk et al. ..................... | 352/243 |
| 4,244,500 | 1/1981 | Fournier ................................. | 224/265 |
| 4,276,675 | 7/1981 | Pioch ........................................ | 16/111 |
| 4,298,149 | 11/1981 | Gottschalk et al. ..................... | 224/201 |
| 4,329,041 | 5/1982 | Mädge et al. ............................. | 354/293 |
| 4,389,675 | 6/1983 | Suzuki et al. ............................ | 358/229 |
| 4,437,753 | 3/1984 | Dunn ......................................... | 354/294 |
| 4,600,284 | 7/1986 | Kondoh et al. ............................ | 354/82 |
| 4,752,794 | 6/1988 | Bohannon ................................ | 354/126 |
| 4,895,286 | 1/1990 | DeRoss ..................................... | 224/265 |
| 4,943,820 | 7/1990 | Larock ....................................... | 354/82 |
| 4,946,272 | 8/1990 | Brown ....................................... | 352/243 |
| 4,963,904 | 10/1990 | Lee ............................................ | 354/82 |
| 5,081,478 | 1/1992 | Hayashida et al. ........................ | 354/81 |
| 5,111,983 | 5/1992 | Simmons et al. ......................... | 224/258 |
| 5,247,852 | 9/1993 | Guerr ........................................ | 74/551.8 |
| 5,424,791 | 6/1995 | Campbell .................................. | 354/82 |
| 5,612,756 | 3/1997 | Kardach ................................... | 396/422 |
| 5,839,704 | 11/1998 | Appleman ............................. | 248/178.1 |
| 5,890,025 | 3/1999 | Hart ......................................... | 396/420 |

FOREIGN PATENT DOCUMENTS 2 306 295A  5/1997  United Kingdom .

*Primary Examiner*—Ramon O. Ramirez
*Assistant Examiner*—Tan Le
*Attorney, Agent, or Firm*—Lyon & Lyon LLP

[57] ABSTRACT

A shoulder-mounted, camera support device having adjustable support bar or bar segments and hand grip assemblies which allow the camera operator to easily adjust positions of the bars and hand grip assemblies. In its preferred configuration, grip position may be adjusted by the operator in a variety of manners without having to release the grip handle by rotating the grip handle thereby unlocking the grip assembly, moving the grip assembly and handle to a desired position and orientation, and then rotating the grip handle thereby locking the grip assembly and handle in place at the desired position and orientation.

32 Claims, 6 Drawing Sheets

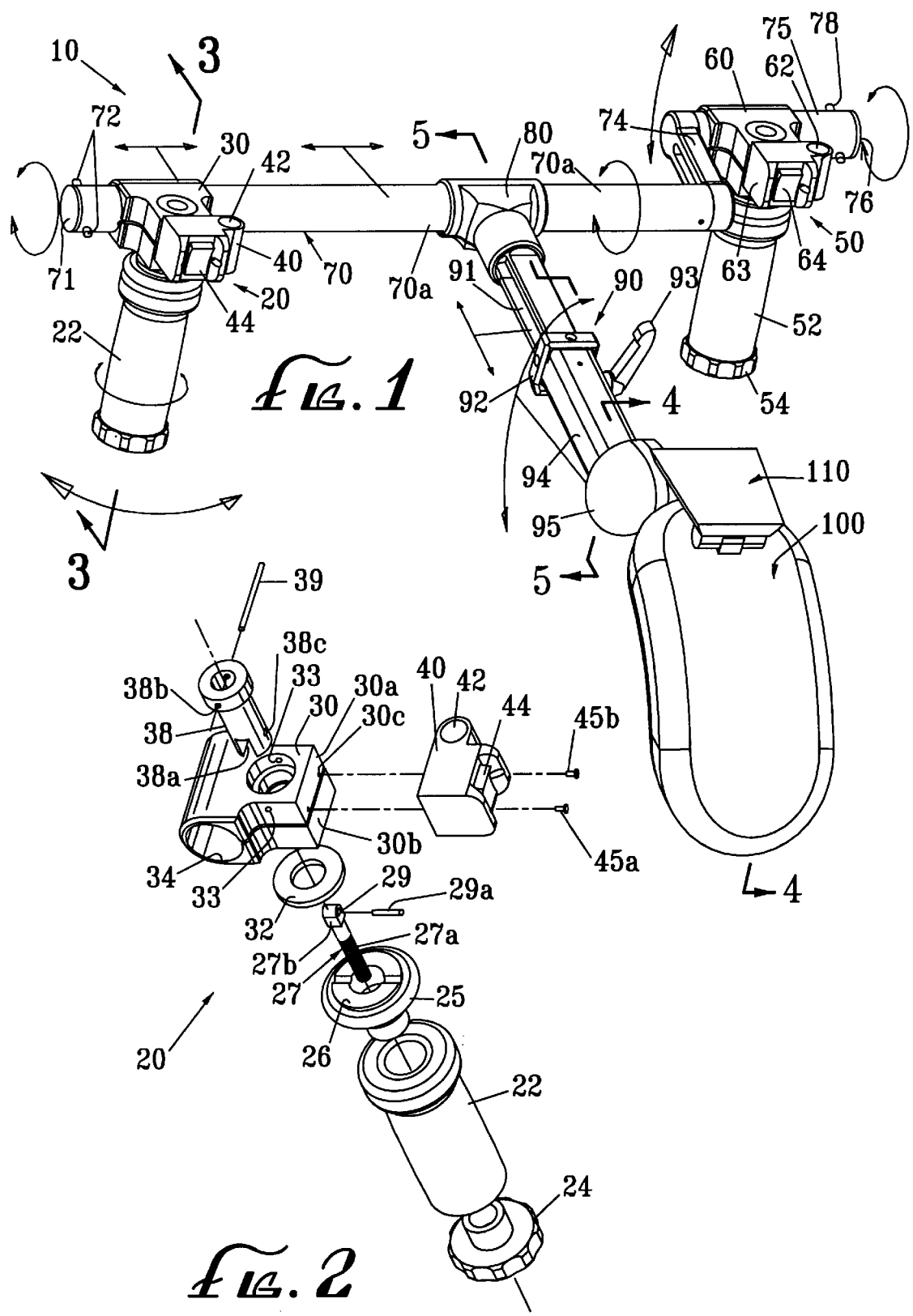

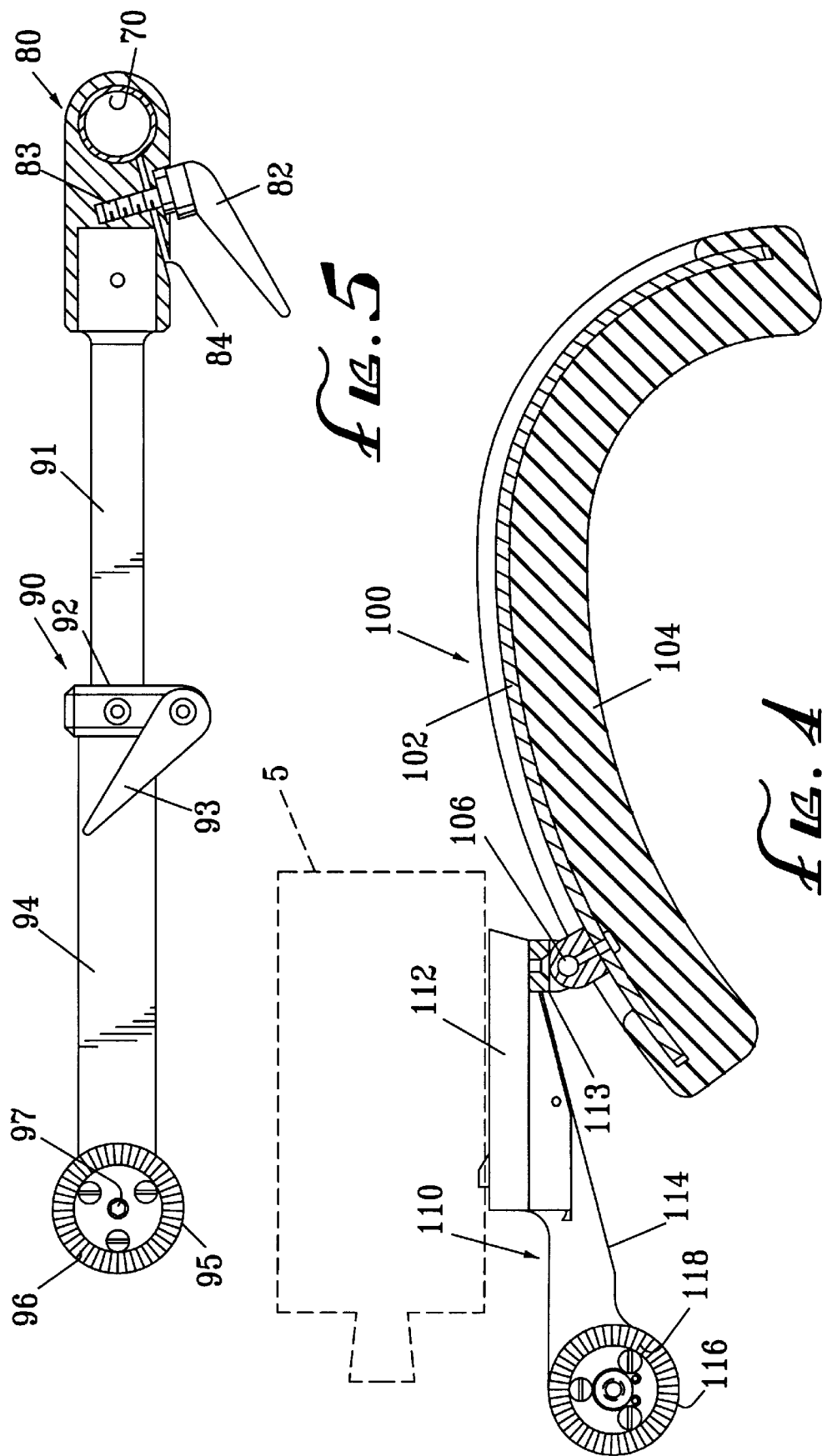

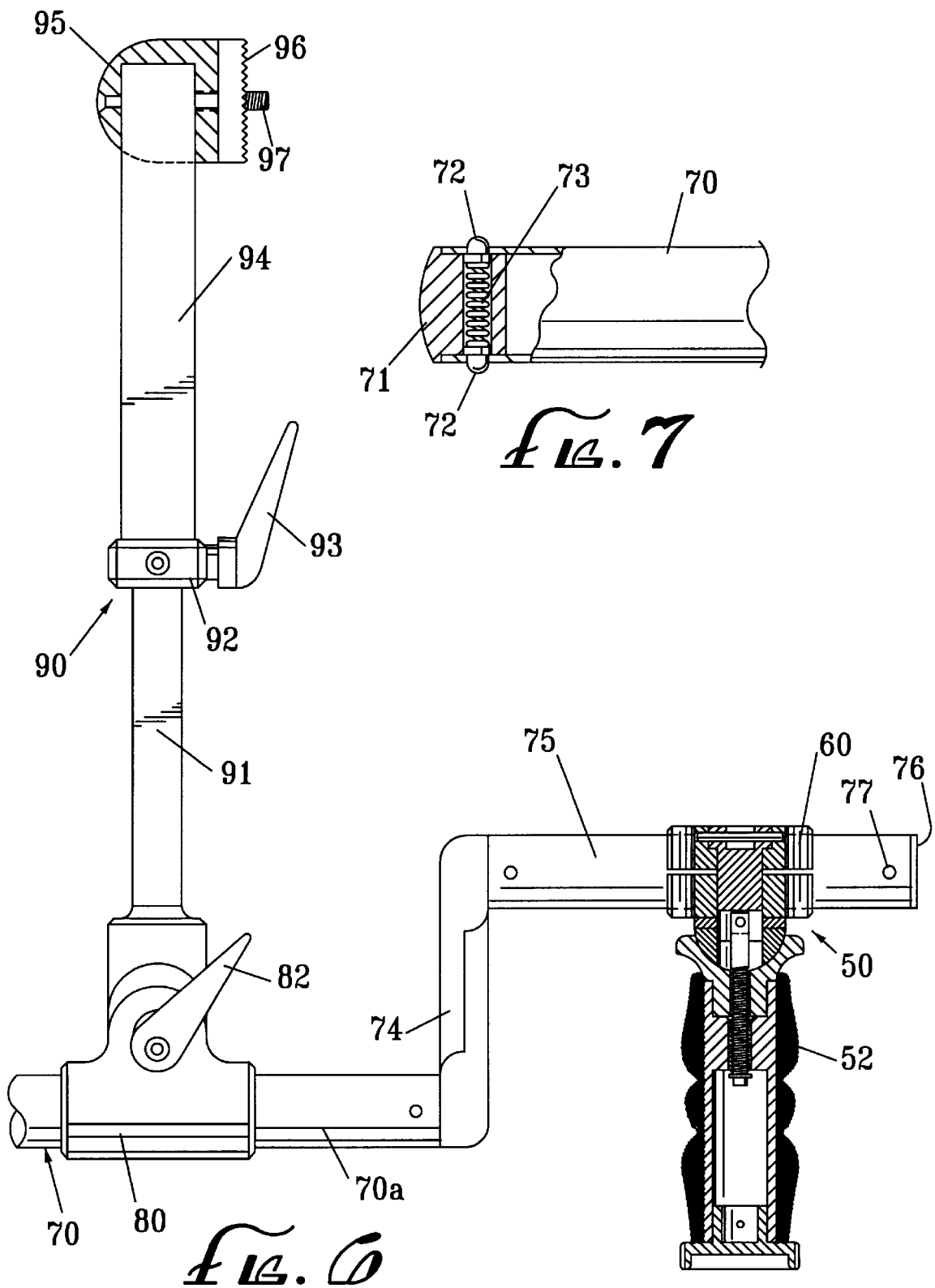

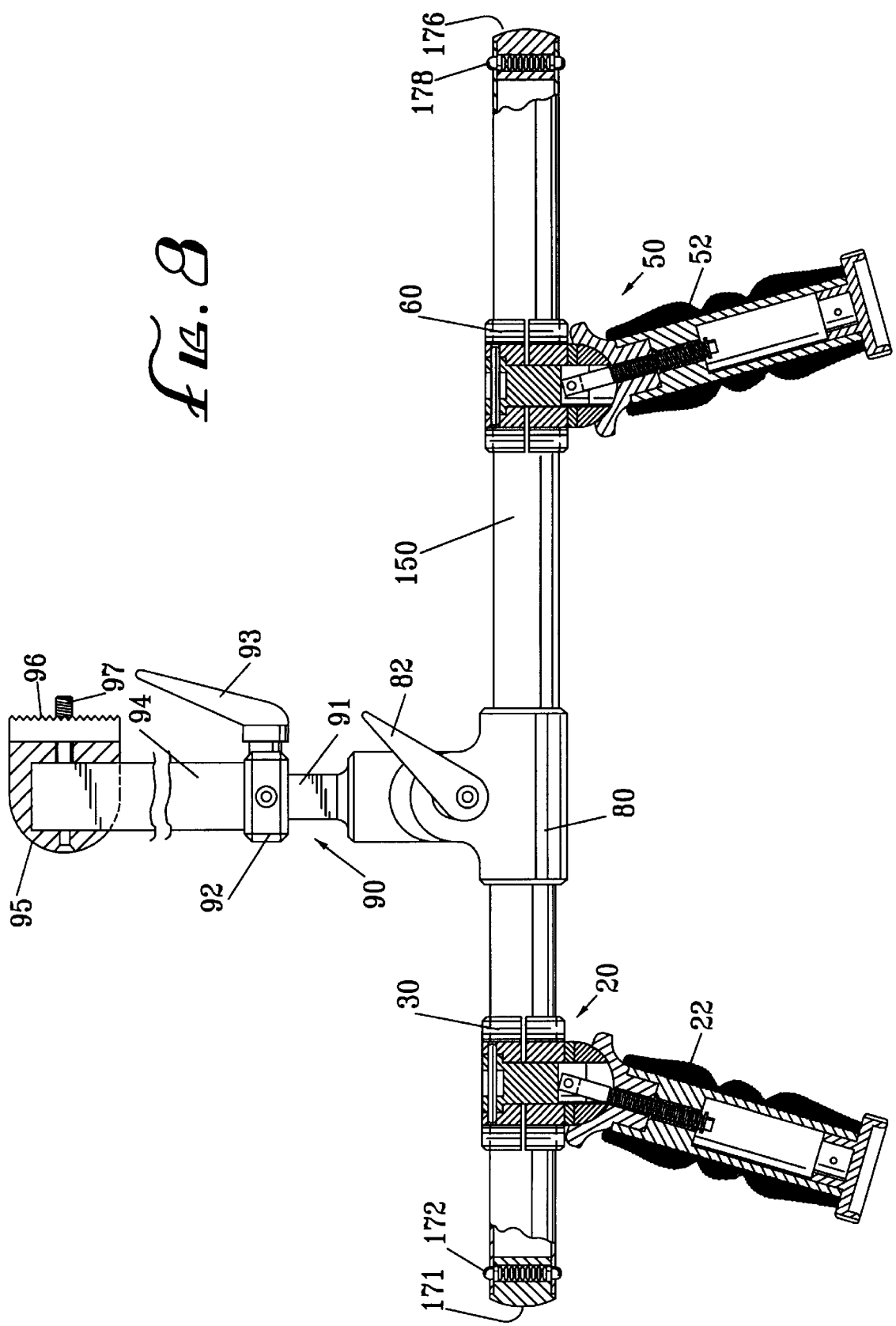

POSITION ADJUSTABLE GRIP SUPPORT FOR MOTION PICTURE CAMERA

BACKGROUND OF THE INVENTION

The field of the present invention relates to equipment used in the motion picture production, whether it be film or video productions such as for feature films, television, sporting events or the like. In film and video production, there is need for strategically positioning the camera for achieving the desired shot. This positioning is achieved through the use of camera cranes, dollies, tripods, tilt heads, handheld supports and other camera support devices.

Certain of these support devices include grip devices for the camera operator to manually move and/or hold the support device. The present inventor has recognized that when positioning the camera to achieve a particular shot, the camera operator may desire to have his/her hand positions in certain orientations for personal preference, comfort, efficiency, or to otherwise facilitate shooting.

SUMMARY OF THE INVENTION

The present invention relates to a camera support or aiming system. In a preferred embodiment, the present invention relates to shoulder-mounted, camera support device having adjustable support bar or bar segments and hand grip assemblies which allow the camera operator to easily adjust the bar and the hand grip assembly positions. In its preferred configuration, a grip positions may be adjusted by rotating the grip thereby unlocking the grip, moving the grip to a desired position and orientation, and then rotating the grip thereby locking it in place at the desired position.

BRIEF DESCRIPTION OF THE DRAWINGS

FIG. 1 is a top left perspective view of a camera support device according to a preferred embodiment of the present invention;

FIG. 2 is an exploded view of the first (left) grip of FIG. 1;

FIG. 4 is a cross sectional view of the camera support section of the device of FIG. 1 taken along line 4—4;

FIG. 5 is a cross-sectional view of the neck post section of the device of FIG. 1 taken along line 5—5;

FIG. 6 is a bottom plan view of a portion of the grip section of device of FIG. 1, with a cross sectional view of the second (right) grip assembly;

FIG. 7 is a detailed of an end portion of the grip bar of FIG. 1 in partial cross section;

FIG. 8 is a top plan view of an alternate grip bar configuration with the hand grips in pivoted positions and the neck post in a collapsed position;

DETAILED DESCRIPTION OF THE PREFERRED EMBODIMENTS

Figure 3:
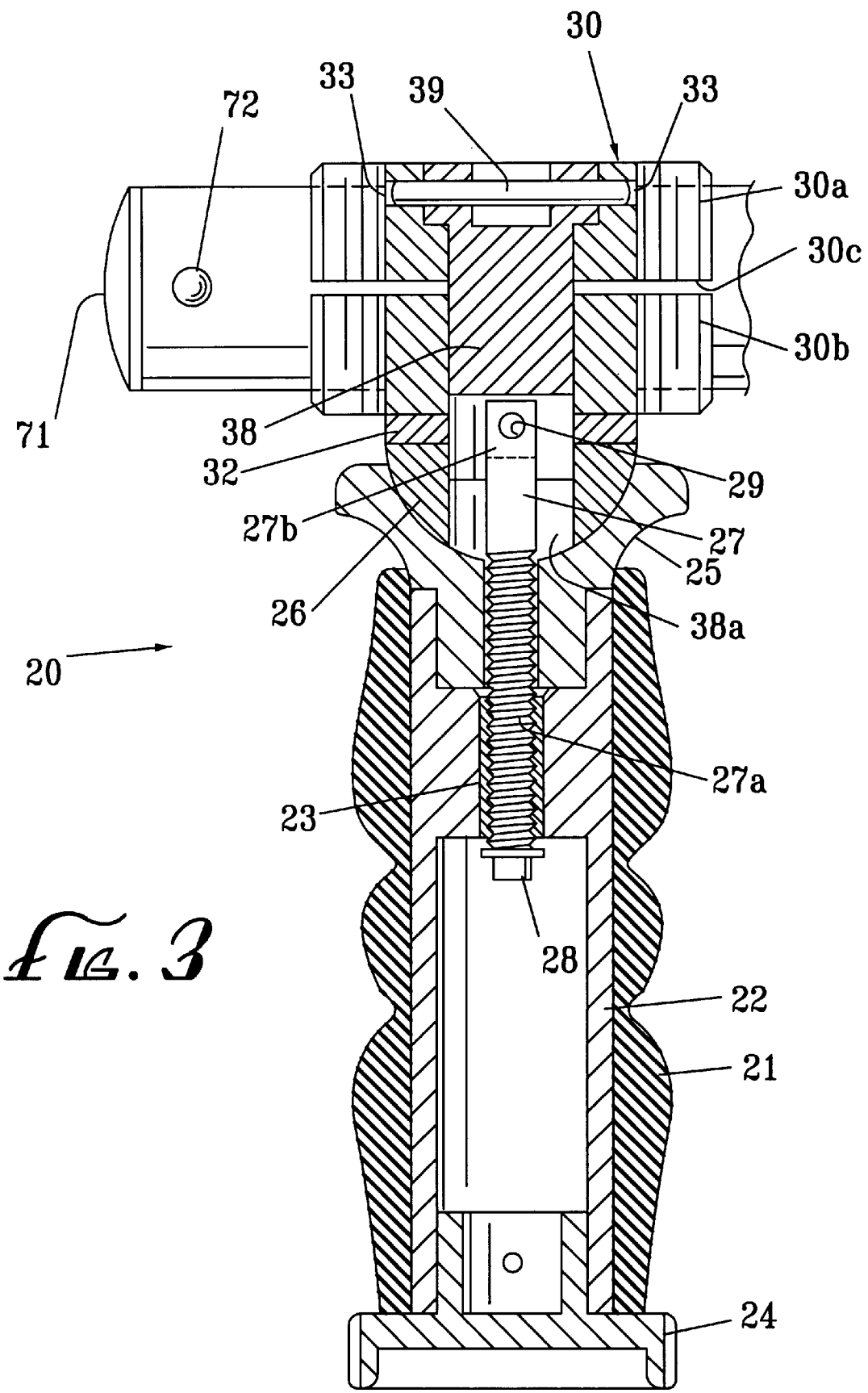
FIG. 3 is a cross-sectional view of the device of FIG. 1 taken along line 3—3.

The preferred embodiments of the present invention will now be described with reference to the drawings. To facilitate the description, a reference numeral representing an element in one figure will represent the same element in any other figure.

FIGS. 1–7 illustrate a first embodiment of a grip support assembly 10. The grip support assembly 10 includes a neck post 90 having a first section 91 mounted at 90° (orthogonally) via a tee 80 to a grip bar 70 and a second section 94 connected to a camera mount section 110 and shoulder support section 100. A first (left) grip 20 is adjustably mounted on the left end 70a of the grip bar 70 and second (right) grip 50 is adjustably mounted on the opposite end 75 of the grip bar 70.

The first section 91 of the neck post 90 telescopes within the second section 94, the second section 94 being hollow or tubular to allow insertion of the first end 91 therewithin. The first neck post section 91 is mounted in a fixed position to the tee 80. Both the first neck post section 91 and the second neck post section 94 have rectangular or square cross sections such that though the first neck post section 91 may longitudinally telescope within the second neck post section 94, the square cross sections prevent relative rotation therebetween. The telescopic position of the first and second neck post sections 91, 94 may be adjusted by a locking clamp 92 operable by a handle 93. Therefore, the length of the neck post 90 is adjustable by operating the handle 93 releasing the locking clamp 92 telescoping the first and second neck post sections 91, 94 inward or outward to the desired position and then operating handle 93 to lock the neck post sections in place to each other.

As best shown in FIG. 5, the tee 80 secured to the first neck post section 91 is adjustably secured to the grip bar 70. The housing of the tee 80 has a split section 84. By action of the bolt 83 attached to the handle 82, rotation of the handle 82 causes a clamping action of the tee housing 80 on the grip bar 70 thereby securing the relative position between the tee 80 and the grip bar 70. When the handle 82 is in the unlocked position, the position of the tee 80 may be adjusted longitudinally along the grip bar 70 and/or rotationally adjusted about the grip bar 70.

As best illustrated in FIGS. 4–5, the camera mount section 110 and shoulder support section 100 are mountable to the neck post 90 via mating locking elements 95, 116. A first locking element 95 is mounted on the second neck support end 94. The locking element 95 includes splines or teeth 96 which secure to and mate with splines or teeth 118 within locking element 116 mounted to camera mount section 110. The camera mount section 110 includes a support bracket 114 having the locking element 116 on one end thereof, a camera mounting plate 112 at a top end thereof and a connector 113 for connection to the shoulder support 110. The mounting angle between the neck post 90 and the camera mount section 110 is adjustable by loosening a bolt 97 between the locking elements 95, 116 separating the elements 95, 116 so that the teeth 96, 118 are not intermeshed, adjusting the angle to the desired position, returning the locking elements 95, 116 so as to mesh the respective teeth 96, 118 and then securing the elements in place via tightening of the bolt 97. By these adjustments, particularly in combination with the grip assembly adjustments described below, the grip handles 22, 52 may be conveniently located near the operator's body permitting the operator to lock elbows against his/her body while gripping the hand grips to facilitate providing steady support.

The shoulder support section 100 is pivotally adjustable via pin 106 to the clamp 113 of the camera mount section 110. The shoulder support section 100 comprises a center frame 102 upon which a pad 104 is mounted to provide cushioning for the shoulder of the camera operator. The camera mounting plate 112 is positioned substantially over the shoulder support section 100 to ensure that the primary weight of the camera (the camera being diagrammatically illustrated, not to scale, as element 5) is oriented rearward, i.e., onto the shoulder of the camera operator, rather than forward toward the grip bar 70. In practice the camera 5 may include a film magazine mounted on a rear end thereof, the camera and magazine extending over and even beyond the shoulder support section 100. As such the center of gravity of the camera 5 is preferably positioned over the shoulder section 100 such that the weight if the camera rests on the shoulder of the camera operator.

The grip bar 70 is formed in as an angled or Z-shape structure comprising a first (main) bar section 70a, an angle section 74 and a second (short) bar section 75. The second bar section 75 and the angle section 74 form an L-shaped section. The angle section 74 is oriented orthogonally to both the main bar section 70a and the right bar section 75 thus enable the second hand grip 52 to be positioned either higher, lower, nearer or further away from the operator than the first hand grip 22. The relative angular position of the angle section 74 to the neck post 90 may be adjusted by rotation of the grip bar 70 relative to the tee 80 as previously described. Thus separate adjustability of the angle section 74 to the main section 70a of the grip bar 70 is not required.

Details of the left grip assembly 20 and the second grip assembly 50 will now be described. The construction of the left grip assembly 20 and the second grip assembly 50 are essentially identical and therefore particular details of the first grip assembly 20 will be described with respect to FIGS. 1–3, but would be equally applicable to the second grip assembly 50.

The first grip assembly 20 includes a housing 30 which locks onto the main section 70a of the grip bar 70 and a handle section 22 which is gripped by the camera operator. The lock housing 30 has an opening 34 which slides over the grip bar 70. The housing 30 is split such that there is a gap 30c between the upper section 30a and the lower section 30b of the housing 30. Clamping the upper section 30a and the lower section 30b together by the operation described below locks the housing 30 on the grip bar 70 at a desired rotational orientation and at a desired longitudinal position.

The grip assembly 20 includes a switch housing 40 mounted by screws 45a, 45b to the housing 30. A thumb operated switch 44 controls the on/off operation of the camera 5 via a cable (not shown) connecting within cable connector 42.

The grip 20 includes a lower grip section 22 over which a grip pad 21 is mounted. The grip pad 21 is held in place by a lower plug 24 and/or via stretch fit or a suitable adhesive. The grip pad 21 may be contoured as shown in FIG. 3 to accommodate the fingers of the camera operator. Alternately, the grip section 22 may comprise a smooth cylindrical unit with or without a grip pad as illustrated in FIGS. 1 and 2.

The grip assembly 20 includes a threaded bolt 27 threadedly connected to a threaded portion 23 within the handle section 22. The bolt 27 includes a lower threaded section 27a and an upper head 27b. The threaded section 27a mates with a female threaded insert 23 within the handle section 22. Rotation of the handle section 22 counterclockwise causes the handle section 22 to actually translate downwardly loosening the cup or socket section 25 from the ball 26 thereby allowing for pivoting adjustment of the handle section 22 about the pin 29a. The bolt 27 includes a cap 28 on its lower end which limits the downward travel of the handle section 22 when the handle 22 is rotated to unlock the grip assembly 20. At its upper end or head 27b, the bolt 27 includes an eye or opening 29 through which a pin 29a secures the bolt 27 within a notch 38a of locking element 38.

The locking element 38 passes into the housing 30 and through the spacer washer 32. The bolt head 27b has a rounded top portion to allow pivoting within the notch 38a. The pin 29a passes through holes 38c in the locking element 38 on opposite sides of the notch 38a allowing the head 27b to be pivotally mounted within the notch 38a. The top end of the locking element 38 has through holes 38b to allow the locking element 38 to be secured within the housing 30 via pin 39 passing through holes 33 in the housing 30.

Thus the position of the hand grip 22 is adjustable via three separate movements, all controlled by a locking and unlocking action actuated by a single rotational motion of the hand grip 22 including: (1) the hand grip section 22 may be pivotally adjusted to the left or right as viewed in FIG. 3 via action of the ball 26 and socket 25 arrangement; (2) the entire grip housing 30 may be transversely adjusted along the grip bar 70; and (3) the grip housing 30 may be rotationally adjusted about the grip bar 70.

As illustrated in FIG. 6, the components of the second grip 50 are identical to the components of the first grip 20 illustrated in FIG. 3 and therefore a detailed description is omitted for the sake of brevity. The operation of the second grip 50 is the same as that of the first grip 20. Rotation of the grip or handle section 52 loosens the grip allowing the grip section 52 to pivot left or right (relative to its position viewed in FIG. 6), rotationally adjust relative to the grip bar section 75, or slide transversely along the grip bar section 75 (such as closer to the tee 80) and then locked into place by retightening of the grip section 52. The second grip housing 60 includes a switch housing 63 having a thumb switch 64 which may be used to control camera operation such as a zoom lens or some other function via electric connection by cable connector 62 through a cable (not shown) to the camera 5.

The overall configuration of the grip support assembly 10 may be readily adapted for alternate configurations. As shown in the detailed section of FIG. 7, the ends of the grip bar 70 includes a left end cap 71 with spring loaded locking knobs 72, 72 passing through holes in the walls of the grip bar 70. The diameter of the cap 71 is coextensive with the diameter of the grip bar 70. In their normal outward positions, the knobs 72 act as stops to prevent transverse adjustment of the grip assembly 20 beyond the end of the grip bar 70. By depressing the knob 72 within the grip bar 70, the first grip assembly 20 may be removed from the grip bar 70. As previously described by loosening of the first grip 22, the housing 30 may be transversely adjusted along the grip bar 70 and then relocked in a desired location.

A locking cap 76 is also positioned on the end of the grip bar section 75 of similar configuration to the locking cap 71 of the left end. The locking cap 76 includes locking knobs 78, 78 spring loaded by a spring (not shown). The knobs 78, 78 in their normal position prevent the removal of the second grip assembly 50 from the grip bar section 75 unless the knobs 78, 78 are depressed.

By unlocking of the lever 82, the tee 80 and neck post assembly 90 may be rotationally adjusted or transversely moved along the bar 70. When the first grip 20 is removed from the grip bar 70 by depressing the knobs 72, the neck post assembly 90 may be removed from the grip bar 70 upon depression of the knobs 72. With the first and second grip assemblies 20, 50 removed from the grip bar 70, the neck assembly 90 may be entirely removed from the grip bar 70. The grip bar 70 may then be repositioned such that the first grip 20 may be installed on the grip bar section 75 passing over the end cap 76 and the second grip assembly 50 may be installed on the grip bar section 75 passing over the end cap assembly 71. In this alternate configuration, the first grip assembly 20 will be adjacent the angle support 74 and grasped by the operator's left hand.

In any of the configurations, the first and second grip assemblies 20, 50 may be installed on either end of the grip bar 70 to enable the user to position camera control switches 44, 64 at the desired hand (i.e. the left hand or right hand).

An alternate grip bar assembly 150 is illustrated in FIG. 8. Unlike the angled grip bar 70 of the previous embodiment, the grip bar 150 is a straight bar with no angled elements. The grip bar 150 bar has end caps 171, 176 on opposite ends of similar configuration as the end cap 71 of the previous embodiment. As can be seen, the neck post assembly 90 has been positioned in approximately the center of the grip bar 150 and the first grip assembly 20 and the second grip assembly 50 have be installed on the respective left and right ends of the grip bar 150. Since the grip bar 150 has no angled section, the grip bar 150 may alternately include a permanent end cap and stop on one end since the first and second grip assemblies 20, 50 and the neck assembly 90 may slide over solely from one end of the grip bar 150 during removal and installation.

Figure 9:
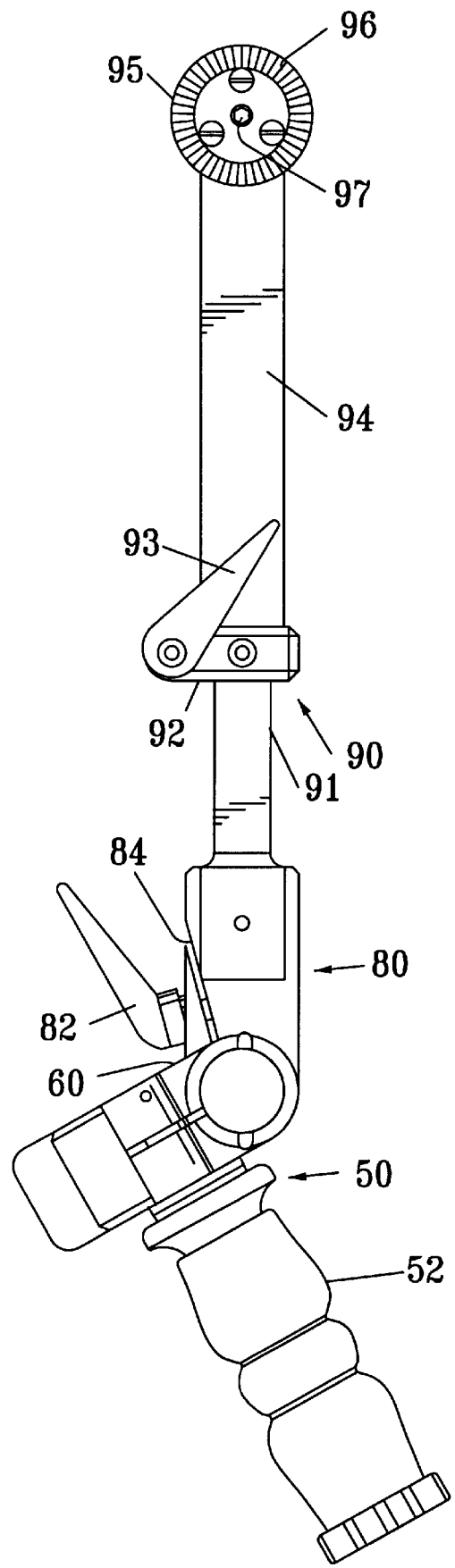
FIG. 9 is a side elevation view of the grip bar assembly of FIG. 8 with the second grip assembly in a rotated position.

FIGS. 8–9 also illustrate a few examples as to how the positions of the grip assemblies 20, 50 and the neck post 90 may be adjusted on the grip bar 150. The grip assemblies 20, 50, the tee 80 and neck post assembly 90 are the same elements with the same element numerals as described above with respect to FIGS. 1–7 and as such other details are not repeated. It will be understood that the various positions of the grip assemblies 20, 50 now described may be similarly adjusted when on the grip bar 70 of FIGS. 1–7. As shown in FIGS. 8–9, the grip assemblies 20 and 50, when unlocked by rotation of the respective grip handle 22, 52, may be adjusted to and then locked in any of one or more of the following positions: (1) the entire grip assemblies 20, 50 may be transversely moved along the bar 150; (2) the grip handles 22, 52 may be pivoted (to the left or right as viewed in FIGS. 8–9); (3) the grip assemblies 20, 50 may pivot about the longitudinal axis of the grip bar 150 such as illustrated by assembly 50 rotating from the position illustrated in FIG. 8 to the position illustrated in FIG. 9. Similarly, by unlocking the locking clamp 82 on tee 80, the grip bar 150 may be rotated relative to the neck post assembly 90 and the neck post assembly 90 may by moved transversely along the grip bar 150. Such adjustment of the neck post assembly 90 is particularly useful in the angled grip bar 70 embodiment of FIG. 1.

FIG. 8 also illustrates the adjustment of the length of the neck post 90, by operation of the handle 93, the clamp 92 releases the first post end 91 allowing it to slide within the second post end 94 thereby adjusting the length of the neck post 90.

The grip assemblies described are highly versatile providing a wide variety of convenient adjustments enabling the camera operator to adjust the grip and support placements according to personal preference and/or particular filming constraints. One advantage of the system is facilitating handle adjustment thus providing a method of adjusting a grip assembly (20 or 50) on a grip bar (70 or 150) comprising the steps of (a) grasping a grip handle (22 or 52 respectively) of the grip assembly;
(b) rotating the grip handle to unlock the grip assembly;
(c) moving the grip assembly transversely along the grip bar to a desired location thereon;
(d) moving the grip assembly rotationally about the grip bar to a desired position;
(e) moving the grip handle to a desired orientation relative to the grip assembly;
(f) rotating the grip handle thereby locking the grip assembly and grip handle in place. The operator may preferably accomplish steps (b) through (f) with a single hand without having to release that hand from the grip handle. A grip assembly may comprise one, two or all three of the adjustment capabilities of steps (c), (d) and (e).

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A support device for a camera, comprising
a grip bar having first and second bar sections,
a shoulder support section;
a camera mount section connected to the shoulder support section;
a neck post having a first post section and a second post section, the second post section being coupled to the camera mount section and the first post section being mounted to a central portion of the grip bar;
a locking element for selectively locking and releasing the neck post to the grip bar to permit rotational adjustment of the grip bar relative to the neck post.

2. A support device according to claim 1 wherein the camera mount section comprises a mounting plate for accepting a motion picture camera.

3. A support device according to claim 1 wherein the camera mount section is pivotally connected to the shoulder support section, and further comprising a locking mechanism for locking the camera mount section to the shoulder support in a desired position.

4. A support device according to claim 1 wherein the grip bar comprises a straight bar.

5. A support device according to claim 1 wherein the neck post is rotationally and transversely adjustable on the grip bar.

6. A support device according to claim 1 wherein the first post section is mounted generally orthogonally to the grip bar.

7. A support device according to claim 1 wherein the first post section is telescopically movable into the second post section.

8. A support device according to claim 1 wherein the grip bar includes hand grip portions disposed at opposite sides of the central portion.

9. A support device for a camera, comprising
a grip bar having first and second bar sections;
a shoulder support section;
a camera mount section connected to the shoulder support section;
a neck post having a first post section and a second post section, the second post section being coupled to the camera mount section and the first post section being rotationally mounted to the grip bar,
a first grip assembly adjustably connected to the first bar section and a second grip assembly adjustably connected to the second bar section.

10. A support device according to claim 9 wherein the first grip assembly includes a first grip housing for attaching onto the grip bar, a first hand grip, and a first ball joint for adjustably connecting the first hand grip to the first grip housing, wherein position of the first hand grip may be adjusted by use of a single hand action rotating the first hand grip in a first direction to loosen it, moving the first hand grip to a desired position, and rotating the first hand grip in a second opposite direction to lock it in place.

11. A support device according to claim 10 wherein upon loosening of the first hand grip
   (1) the first hand grip is pivotally adjustable relative to the first grip housing;
   (2) the first grip housing is transversely movable along the grip bar; and
   (3) the first grip housing is rotationally adjustable about the grip bar.

12. A support device for a camera, comprising
   a grip bar having first and second bar sections;
   a shoulder support section;
   a camera mount section connected to the shoulder support section;
   a neck post having a first post section and a second post section, the second post section being coupled to the camera mount section and the first post section being rotationally mounted to the grip bar,
   wherein the neck post comprises an outer tube connected to the camera mount section and an inner post connected to the grip bar and telescoping within the outer tube.

13. A support device comprising
   a grip bar having first and second bar sections;
   a shoulder support section;
   a camera mount section connected to the shoulder support section;
   a neck post having a first post section and a second post section, the second post section being coupled to the camera mount section and the first post section being rotationally mounted to the grip bar,
   wherein the second bar section comprises an L-shaped end pivotally mounted perpendicularly to the first bar section.

14. A support device for a camera, comprising
   a grip bar having first and second bar sections;
   a shoulder support section;
   a camera mount section connected to the shoulder support section;
   a neck post having a first post section and a second post section, the second post section being coupled to the camera mount section and the first post section being rotationally mounted to the grip bar,
   wherein the grip bar comprises an angle bar section between the first bar section and the second bar section, the angle bar section being perpendicular to both the first bar section and the second bar section.

15. A support device for a camera, comprising
   a grip bar having first and second bar sections;
   a shoulder support section;
   a camera mount section connected to the shoulder support section; and
   a neck post having
      a first post section and a second post section, the second post section being coupled to the camera mount section and the first post section being rotationally mounted to the grip bar, the second neck post section being tubular such that the first neck post section telescopes within the second neck post section,
      a locking element for securing the second neck post section to the first post section at a desired position.

16. A support device according to claim 15 wherein the first neck post section and the second neck post section have mating square cross sections for preventing relative rotation therebetween.

17. A support device for a camera, comprising
   a grip bar having first and second bar sections,
   a shoulder support section;
   a camera mount section connected to the shoulder support section;
   a neck post having a first post section and a second post section, the second post section being coupled to the camera mount section and the first post section being mounted to the grip bar;
   a first grip assembly adjustably connected to the first bar section and a second grip assembly adjustably connected to the second bar section, wherein the first grip assembly includes a first grip housing for attaching onto the grip bar, a first hand grip, and a first ball joint for adjustably connecting the first hand grip to the first grip housing, wherein position of the first hand grip may be adjusted by use of a single hand action rotating the first hand grip in a first direction to loosen it, moving the first hand grip to a desired position, and rotating the first hand grip in a second opposite direction to lock it in place.

18. A support device according to claim 17 further comprising a second grip assembly adjustably connected to the second bar section, wherein the second grip assembly includes a second grip housing for attachment onto the grip bar and a second hand grip mounted to the second grip housing, wherein position of the second grip assembly may be adjusted about the grip bar by use of a single hand action moving the second hand grip in a first direction to unlock the second grip housing, moving the second grip assembly to a desired position on the grip bar, and moving the second hand grip in a second opposite direction to lock it in place.

19. A support device according to claim 17 wherein upon loosening of the first hand grip
   (1) the first hand grip is pivotally adjustable relative to the first grip housing;
   (2) the first grip housing is transversely movable along the grip bar; and
   (3) the first grip housing is rotationally adjustable about the grip bar.

20. A portable camera system, comprising
   a grip bar having first and second bar sections;
   a camera support section including a camera mount and a shoulder support section;
   a camera mounted on the camera mount;
   a neck post having one end connected to the camera support section and a second end connected to the grip bar;
   a first grip assembly adjustably connected to the first bar section, wherein the first grip assembly includes a first grip housing for attachment onto the grip bar and a first hand grip mounted to the first grip housing, wherein position of the first grip assembly may be adjusted about the grip bar by use of a single hand action moving the first hand grip in a first direction to unlock the first grip housing, moving the first grip assembly to a desired position on the grip bar, and moving the first hand grip in a second opposite direction to lock it in place.

21. A portable camera system according to claim 20 wherein the first grip housing is unlocked by rotation of the first hand grip in a first direction, whereupon once unlocked (1) the first grip housing is transversely movable along the grip bar; and (2) the first grip housing is rotationally adjustable about the grip bar.

22. A portable camera system according to claim 20 wherein the first grip housing is unlocked by rotation of the first hand grip in a first direction, whereupon once unlocked (1) the first hand grip is pivotally adjustable relative to the first grip housing;

(2) the first grip housing is transversely movable along the grip bar; and (3) the first grip housing is rotationally adjustable about the grip bar.

23. A portable camera system according to claim 20 further comprising a second grip assembly adjustably connected to the second bar section, wherein the second grip assembly includes a second grip housing for attachment onto the grip bar and a second hand grip mounted to the second grip housing, wherein position of the second grip assembly may be adjusted about the grip bar by use of a single hand action moving the second hand grip in a first direction to unlock the second grip housing, moving the second grip assembly to a desired position on the grip bar, and moving the second hand grip in a second opposite direction to lock it in place.

24. A method of adjusting a grip assembly on a grip bar of a camera or aiming system, comprising the steps of (a) grasping a grip handle of the grip assembly;

(b) rotating the grip handle to unlock the grip assembly;

(c) moving the grip assembly transversely along the grip bar to a desired location;

(d) moving the grip assembly rotationally about the grip bar to a desired position;

(e) moving the grip handle to a desired orientation relative to the grip assembly;

(f) rotating the grip handle thereby locking the grip assembly and grip handle in place.

25. A method according to claim 24 wherein steps (b) through (f) are accomplishable by single hand actions on the grip handle without releasing the grip handle.

26. A method of adjusting a grip assembly on a grip bar, comprising the steps of (a) grasping a grip handle of the grip assembly;

(b) rotating the grip handle to unlock the grip assembly;

(c) adjusting the grip assembly to a desired orientation or position;

(d) rotating the grip handle thereby locking the grip assembly in the desired orientation or position.

27. A support device for a camera, comprising a grip bar having first and second bar sections;

a shoulder support section;

a camera mount section connected to the shoulder support section;

a neck post having a first post section and a second post section, the second post section being coupled to the camera mount section, wherein the camera mount section is pivotally connected to the shoulder support section to allow pivotal adjustment about a horizontal axis, and further comprising a locking mechanism for locking the camera mount section to the shoulder support in a desired position.

28. A grip assembly adjustably connectable to a support bar for a camera system, comprising a grip housing attachable onto the bar and a hand grip mounted to said grip housing, wherein position of said grip assembly being adjustable relative to the support bar by use of a single hand action rotating said hand grip in a first direction to unlock said grip assembly, moving said grip assembly to a desired position relative to the support bar, and rotating said hand grip in a second opposite direction to lock said grip assembly at the desired position.

29. A grip assembly according to claim 28 wherein said grip assembly once unlocked permits said grip housing to be moved transversely along said support bar.

30. A grip assembly according to claim 28 wherein said grip assembly once unlocked permits said grip housing to be moved rotationally about said support bar.

31. A grip assembly according to claim 28 wherein said grip assembly once unlocked permits said hand grip to be pivotally adjustable.

32. A grip assembly according to claim 28 further comprising a ball joint for mounting the hand grip to the grip housing.

* * * * *